(12) United States Patent
Vuk

(10) Patent No.: US 8,065,878 B2
(45) Date of Patent: Nov. 29, 2011

(54) TWO PHASE EXHAUST FOR INTERNAL COMBUSTION ENGINE

(75) Inventor: Carl T. Vuk, Denver, IA (US)

(73) Assignee: Deere & Company, Moline, IL (US)

( * ) Notice: Subject to any disclaimer, the term of this patent is extended or adjusted under 35 U.S.C. 154(b) by 771 days.

(21) Appl. No.: 12/045,390

(22) Filed: Mar. 10, 2008

(65) Prior Publication Data

US 2009/0223220 A1  Sep. 10, 2009

(51) Int. Cl.
*F02B 33/00* (2006.01)
*F02B 75/02* (2006.01)
*F02B 33/44* (2006.01)
*F01L 1/34* (2006.01)

(52) U.S. Cl. ........ 60/612; 123/562; 123/90.15; 123/315
(58) Field of Classification Search ....... 123/559.1–566, 123/90.15, 315; 60/597–624
See application file for complete search history.

(56) References Cited

U.S. PATENT DOCUMENTS

| | | | |
|---|---|---|---|
| 4,674,284 A * | 6/1987 | Kronogard et al. | 60/624 |
| 4,813,232 A | 3/1989 | Hitomi et al. | 60/313 |
| 4,864,811 A * | 9/1989 | Pfefferle | 60/777 |
| 4,959,961 A * | 10/1990 | Hiereth | 60/612 |
| 5,857,336 A * | 1/1999 | Paul et al. | 60/597 |
| 6,347,619 B1 * | 2/2002 | Whiting et al. | 123/568.12 |
| 6,415,600 B1 | 7/2002 | Lejon | 60/280 |
| 6,438,956 B1 | 8/2002 | Olofsson | 60/605.1 |
| 6,460,337 B1 | 10/2002 | Olofsson | 60/605.1 |
| 6,595,183 B1 | 7/2003 | Olofsson | 123/315 |
| 6,883,319 B2 | 4/2005 | Ekenberg | 60/602 |
| 2003/0000211 A1 | 1/2003 | Drangel et al. | 60/602 |
| 2005/0241597 A1 * | 11/2005 | Weber et al. | 123/90.12 |
| 2006/0070382 A1 | 4/2006 | Karlsson | 60/612 |
| 2007/0130946 A1 | 6/2007 | Winsor et al. | |
| 2007/0130948 A1 * | 6/2007 | Boehm et al. | 60/612 |

FOREIGN PATENT DOCUMENTS

| | | |
|---|---|---|
| GB | 2185286 | 1/1986 |
| GB | 2423797 A | 6/2006 |
| JP | 61210224 A | 9/1986 |
| JP | 63009616 A * | 1/1988 |
| JP | 63009617 A * | 1/1988 |
| JP | 2004360559 A | 12/2004 |

* cited by examiner

*Primary Examiner* — Mary A Davis
(74) *Attorney, Agent, or Firm* — Taylor IP, P.C.

(57) ABSTRACT

An internal combustion engine having a reciprocating multi cylinder internal combustion engine with multiple valves. At least a pair of exhaust valves are provided and each supply a separate power extraction device. The first exhaust valves connect to a power turbine used to provide additional power to the engine either mechanically or electrically. The flow path from these exhaust valves is smaller in area and volume than a second flow path which is used to deliver products of combustion to a turbocharger turbine. The timing of the exhaust valve events is controlled to produce a higher grade of energy to the power turbine and enhance the ability to extract power from the combustion process.

17 Claims, 1 Drawing Sheet

US 8,065,878 B2

TWO PHASE EXHAUST FOR INTERNAL COMBUSTION ENGINE

This invention was made with Government support under contract DE-FC26-05NT42422 awarded by the Department of Energy. The United States Government has certain rights in this invention.

FIELD OF THE INVENTION

The present invention relates to internal combustion engines and more specifically to prime mover systems incorporating internal combustion engines and power extraction devices.

BACKGROUND OF THE INVENTION

For over a hundred years, piston engines have been utilized to convert the energy in hydrocarbon based fuel to useful power outputs. Typically, these engines have incorporated variable volume combustion chamber or chambers using a cycle having an intake portion, a compression portion, an expansion portion and an exhaust portion. The variable volume combustion chamber is most typically defined by a reciprocating piston in a cylinder bore and connected by appropriate mechanical devices to a crankshaft or other rotary output component. The engines may be two cycle or four cycle according to the need.

The consideration of efficiency has always been important but with advances in regulatory limits during the last twenty years, reducing emissions, including nitrous oxides, has become exceedingly important. The usual steps for combustion management to minimize emissions typically decrease efficiency of the engine. In the case of the compression ignition or diesel engine cycle, the need to reduce oxides of nitrogen requires significant alteration to the operating conditions which tends to decrease the otherwise outstanding efficiency of such an engine type.

A number of attempts have been made to increase efficiency by fully utilizing the energy available in such engines through power extraction devices in the exhaust of the engine. Such power extraction devices may be a turbo supercharger (turbocharger) which receives the exhaust from the engine and drives a compressor connected to the engine intake by appropriate manifolds. The heat of pressurization by the compressor may be supplied to an intercooler or aftercooler to reduce the temperature of the gases flowing into the engine and thus increase the density of the mixture. Another energy extraction device is found in a power turbine which may be used to supply additional power to the engine output via an appropriate mechanical connection or may be used to drive a turbo generator supplying electrical energy for accessory and other loads.

While some systems have been proposed to provide a separate exhaust for different power extraction devices, such systems do not provide a system having a maximum efficiency.

Accordingly, what is needed in the art is a prime mover system incorporating an internal combustion engine and power extraction devices which more efficiently utilize the energy available from the internal combustion engine.

SUMMARY OF THE INVENTION

In one form, the invention is a prime mover system having a reciprocating internal combustion engine. The engine has at least one intake valve for admitting combustion air into a variable volume combustion chamber with a volume varying between a minimum and maximum and at least a first and second valve for discharging products of combustion. A first exhaust flow path is provided from the first exhaust valve and a power turbine is fluidly connected to the first exhaust flow path and drives a load. A second exhaust flow path from the second exhaust valve is fluidly connected to a turbocharger having a turbine fluidly connected to the second exhaust flow path and a compressor driven by the turbine for pressurizing air for delivery to the at least one intake valve. A valve actuation system is provided for opening the first exhaust valve to discharge exhaust to the power turbine before the chamber has reached a maximum volume after a combustion event and to open the second exhaust valve to discharge exhaust to the turbocharger turbine after the chamber has reached maximum volume.

In another form, the invention is a method of operating an internal combustion engine having at least one intake valve for admitting combustion air into a variable volume combustion chamber and at least a first and second exhaust valve for discharging products of combustion. The method includes opening the first exhaust valve to exhaust a portion of the products of combustion approximately before said variable volume combustion chamber reaches its maximum volume after a combustion event to drive a power turbine connected to a load. The second exhaust valve is opened to discharge exhaust to a turbocharger, after the combustion chamber has reached its maximum volume after said combustion event.

DETAILED DESCRIPTION OF THE INVENTION

Figure 1:
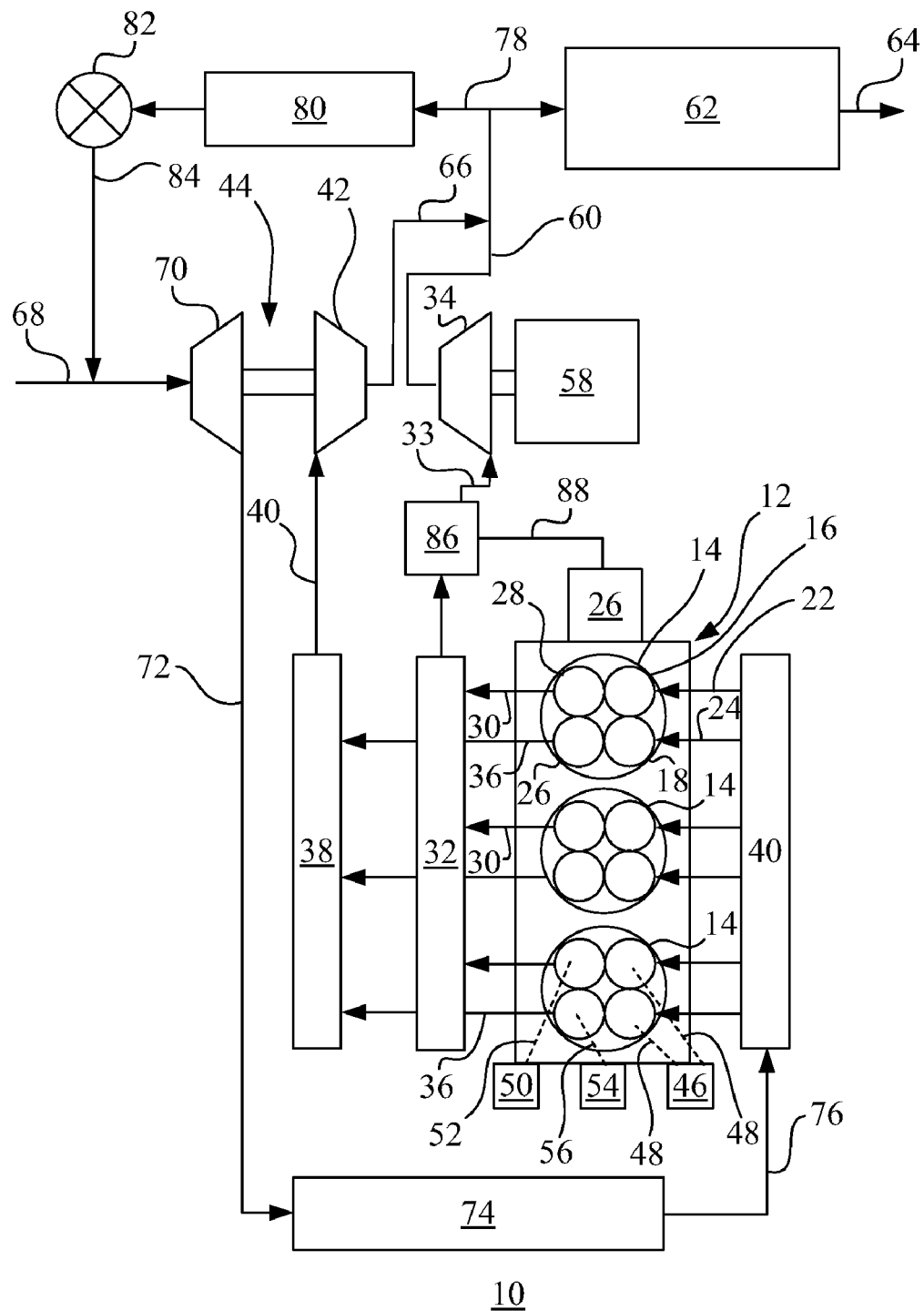
FIG. 1 shows a schematic drawing of a prime mover system embodying the present invention.

FIG. 1 shows a prime mover system 10 having an internal combustion engine 12 with multiple cylinders in which pistons (not shown) reciprocate to provide variable volume combustion chambers 14. Although the engine shows three cylinders, it should be apparent to those skilled in the art that a great variety in the number of cylinders may be employed, according to the size and to the duty cycle required of the engine 12. The combustion chamber 14 has at least one intake valve 16 and preferably an additional intake valve 18 for admitting combustion air from an intake manifold 20 passed via passages 22 and 24. The air thus introduced into combustion chamber 14 goes through a cycle including an intake portion, compression portion, expansion portion and exhaust portion. The air that has been pressurized is combined with fuel from a fuel system 26 and ignited to combust and drive the expansion portion of the cycle to generate power.

The combustion process may be a spark ignition in which a combustible hydrocarbon fuel is mixed with intake air from intake manifold 20 and ignited by an ignition device, usually in the form of a spark plug. The mixing of fuel and air may take place in the intake manifold passages 22 and 24 and even in the combustion chamber 14. Another form of combustion type is compression ignition in which the pressurized air from intake manifold 20 is pressurized to such a degree that when fuel is injected directly into the combustion chamber 14 from fuel system 26 the mixture ignites and produces the expansion portion of the cycle. Many varieties of fuel systems are utilized for this purpose and the current type most in use is a system in which the fuel quantity and timing is controlled electronically and the pressure generated either at each individual cylinder, in the case of a unit injector, or in a high pressure common rail.

The combustion chambers 14 also have exhaust valve 26 and 28 for each cylinder to discharge products of combustion. The exhaust valve 28 fluidly connects to a first exhaust flow path 30 leading to an exhaust manifold 32 and then to a power turbine 34 via conduit 33. A second exhaust flow path 36 leads from valve 26 to a second exhaust manifold 38 connecting via conduit 40 to a turbine 42 of a turbocharger 44. As will be described in detail below, the cross-sectional flow area of the first exhaust passages 30 are smaller than the cross-sectional flow area of the second exhaust passages 36. Furthermore the total volume of the exhaust passages 30, exhaust manifold 32, and conduit 33 is smaller than the volume of the corresponding second exhaust passages 36, exhaust manifold 38 and passage 40.

The valves 14, 18, 26 and 28 are actuated by appropriate systems. The intake valves 16 and 18 are actuated by a system schematically shown at 46 having mechanical interconnections represented by dashed lines 48. Like fuel systems, the valve actuation systems can be any one of a variety of systems including hydro-mechanical or piezoelectric. The valves 28 are actuated by a device 50 mechanically interconnected by an appropriate system indicated by dashed line 52. The valves 26 are actuated by a system 54 through mechanical interconnection represented by 56.

The output from power turbine 34 may be used to drive a load 58 which may be a turbo generator or a device that mechanically interconnects with the prime output of internal combustion engine 12. The gases discharged from power turbine 34 pass through conduit 60 where they pass through an aftertreatment device 62 and finally to an exhaust 64. The aftertreatment device may be used to remove particulates and reduce oxides of nitrogen through appropriate catalysts and other processes. The output from turbocharger turbine 42 passes through conduit 66 where it joins conduit 60 and passes through the aftertreatment device 62.

Intake air for engine 12 is taken from ambient via conduit 68 which feeds a compressor 70 driven by turbine 42 for pressurizing air for delivery through conduit 72 to an aftercooler 74 and conduit 76 to the intake manifold 40.

The prime mover system may also include exhaust gas recirculation (EGR) which has a conduit 78 connected to conduit 60 and leading to an optional EGR cooler 80 and appropriate metering device 82 to introduce a portion of the products of combustion via conduit 84 to the inlet conduit 68.

Optionally, a combustor 86 may be interposed in line in conduit 33 upstream of power turbine 34. Combustor 86 receives fuel via a line 88 extending to fuel system 26. Combustor 86 incorporates an appropriate ignition device and controls to produce additional energy to power turbine 34 as needed.

In the operation of engine 12, the combustion chambers 14 have a variable volume which ranges between a minimum and maximum volume. When the combustion chambers 14 incorporate reciprocating pistons it is common to refer to the minimum volume condition as top dead center (TDC) and the maximum volume condition as bottom dead center (BDC). The intake portion of the cycle causes valves 16 and 18 to be open to admit air for combustion into the combustion cylinder. The air thus admitted is compressed to a point where the combustion chamber 14 is at a minimum volume state. At this point combustion occurs and the energy of combustion drives the combustion chamber volume towards a maximum volume condition. When the pistons are defining the variable volume portion of the chamber the combustion event drives the piston towards a maximum volume state and the movement is converted into a rotary output. In the past, the thermal energy of the process has been focused on to the exclusion of the blow down energy of the gases within the chamber. In accordance with the invention, the valves 28 are opened before the combustion chamber reaches maximum volume so that a portion of the energy otherwise supplied to the piston at a lower energy rate is made available to drive the power turbine 34.

The valve actuation system 50 provides a faster opening of the valve 28 than valve 26 and the smaller cross sectional flow area and volume between the combustion chamber and the power turbine ensures that the maximum pressure is available at the power turbine 34. The faster opening rate of valve 28 reduces throttling loses across that valve. The valve actuation system 50 opens the valve 28 at approximately 90 degrees before BDC, or maximum chamber volume. This causes the pressure ratio across turbine 34 to be greater than otherwise is experienced in such a system. The power turbine 34 has a pressure ratio of from between approximately 4-6:1 so that a maximum amount of energy is extracted via the power turbine 34. The actuation system 50 then closes the valves 28 at approximately BDC or maximum combustion chamber volume and then the actuation system 54 opens valves 26 to provide the exhaust of the products of combustion which are passed to the turbocharger turbine 42 via a larger flow path and larger capacity system. This splitting of the exhaust flows ensures that the energy in the form of pressure is available in an optimum manner to the power turbine 34 and the remaining energy available is passed through a larger flow area to the turbocharger turbine to provide optimum utilization of the energy available from the combustion process.

Such a system allows much higher power output than is seen from current turbo compounded engine. In addition, the arrangement of the power extraction devices permits an enhanced EGR process in which a minimum of EGR is required to reduce emissions.

Having described the preferred embodiment, it will become apparent that various modifications can be made without departing from the scope of the invention as defined in the accompanying claims.

The invention claimed is:

1. A prime mover system comprising:
    a reciprocating internal combustion engine having at least one intake valve for admitting combustion air into a variable volume combustion chamber with a volume varying between a minimum and maximum and at least a first and second exhaust valve for discharging products of combustion;
    a first exhaust flow path from said first exhaust valve;
    a power turbine fluidly connected to said first exhaust flow path and driving a load;
    a second exhaust flow path from said second exhaust valve;
    a turbocharger having a turbine fluidly connected to said second exhaust flow path and having a compressor driven by said turbine for pressurizing air for delivery to said at least one intake valve; and
    a valve actuation system for opening said first exhaust valve to discharging exhaust to said power turbine before said chamber has reached maximum volume after a combustion event and to open said second exhaust valve to discharge exhaust to said turbocharger turbine after said chamber has reached maximum volume wherein said first exhaust path has one of a smaller area and smaller volume than said second flow path.

2. The prime mover system as claimed in claim 1, wherein said power turbine is a high pressure power turbine.

3. The prime mover system as claimed in claim 2, wherein the pressure ratio of said power turbine is approximately 4-6:1.

4. The prime mover system as claimed in claim 1, wherein said first exhaust valve is opened approximately 90 degrees before maximum combustion chamber volume.

5. The prime mover system as claimed in claim 4, wherein said first exhaust valve closes at approximately maximum combustion chamber volume.

6. The prime mover system as claimed in claim 1, wherein said valve actuation system has a faster opening rate for said first exhaust valve than said second exhaust valve to reduce throttling losses across said first exhaust valve.

7. The prime mover system as claimed in claim 1, wherein said second exhaust valve opens at approximately maximum combustion chamber volume.

8. The prime mover system as claimed in claim 1, wherein the load for said power turbine is a turbo generator.

9. The prime mover system as claimed in claim 1, further comprising a conduit downstream of and receiving fluid flow from said power turbine and said turbocharger turbine and an exhaust gas recirculation (EGR) system fluidly connected to said conduit for recirculating products of combustion to an intake.

10. The prime mover system as claimed in claim 1, further comprising a combustor fed with fuel interposed in said first exhaust flow path for generating additional power to said power turbine.

11. A method of operating an internal combustion engine having at least one intake valve for admitting combustion air into a variable volume combustion chamber and at least a first and second exhaust valve for discharging products of combustion, said method comprising:
   opening said first exhaust valve to exhaust a portion of the products of combustion approximately before said variable volume combustion chamber reaches its maximum volume after a combustion event to drive a power turbine connected to a load; and
   opening said second exhaust valve to discharge exhaust to a turbocharger, after said combustion chamber has reached its maximum volume after said combustion event wherein said first exhaust valve is opened at a faster rate than the second exhaust valve and wherein said first exhaust valve is open to one of a smaller cross sectional flow area than the second exhaust valve and a first flow path in fluid communication with said first exhaust valve having a smaller volume than a second flow path in fluid communication with said second exhaust valve.

12. The method as claimed in claim 11, wherein said second valve is opened at approximately the maximum volume of said combustion chamber.

13. The method as claimed in claim 11, wherein the load for said power turbine is a turbo generator.

14. The method as claimed in claim 11, wherein the products of wherein further comprising a step of receiving the fluid from said power turbine and said turbocharger and recirculating a portion of the flow to the at least one intake valve.

15. The method as claimed in claim 11, further comprising the step of interposing a combustor between the first exhaust valve and said power turbine for increasing the energy thereto.

16. A method of operating an internal combustion engine having at least one intake valve for admitting combustion air into a variable volume combustion chamber and at least a first and second exhaust valve for discharging products of combustion, said method comprising:
   opening said first exhaust valve to exhaust a portion of the products of combustion approximately before said variable volume combustion chamber reaches its maximum volume after a combustion event to drive a power turbine connected to a load; and
   opening said second exhaust valve to discharge exhaust to a turbocharger, after said combustion chamber has reached its maximum volume after said combustion event, wherein said power turbine is a high pressure turbine and has a pressure ratio of from between approximately 4-6:1 and wherein said first exhaust valve is opened approximately 90 degrees before the maximum volume of said combustion chamber.

17. The method as claimed in claim 16, wherein the first exhaust valve is closed at or before approximately the maximum volume of said combustion chamber.

\* \* \* \* \*